(12) United States Patent
Dageville et al.

(10) Patent No.: US 11,586,761 B2
(45) Date of Patent: *Feb. 21, 2023

(54) ENCRYPTING DATABASE FILES

(71) Applicant: Snowflake Inc., Bozeman, MT (US)

(72) Inventors: Benoit Dageville, Foster City, CA (US); Peter Povinec, Redwood City, CA (US); Philipp Thomas Unterbrunner, Belmont, CA (US); Martin Hentschel, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,312

(22) Filed: Nov. 29, 2021

(65) Prior Publication Data

US 2022/0083684 A1 Mar. 17, 2022

Related U.S. Application Data

(63) Continuation of application No. 17/228,379, filed on Apr. 12, 2021, now Pat. No. 11,188,674, which is a continuation of application No. 15/286,112, filed on Oct. 5, 2016, now Pat. No. 10,977,383.

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01); *G06F 2221/2107* (2013.01)

(58) Field of Classification Search
CPC .............. G06F 21/6227; G06F 21/602; G06F 2221/2107
See application file for complete search history.

(56) References Cited

U.S. PATENT DOCUMENTS

| | | |
|---|---|---|
| 5,963,642 A | 10/1999 | Goldstein |
| 7,490,248 B1 | 2/2009 | Valfridsson et al. |
| 8,477,932 B1 | 7/2013 | Plotkin et al. |
| 8,626,749 B1 | 1/2014 | Trepetin et al. |
| 9,773,118 B1 | 9/2017 | Bennett et al. |
| 2005/0177716 A1 | 8/2005 | Ginter et al. |
| 2006/0136732 A1 | 6/2006 | Vandermoien |
| 2007/0079119 A1 | 4/2007 | Mattsson et al. |
| 2008/0033960 A1 | 2/2008 | Banks et al. |
| 2009/0100033 A1 | 4/2009 | Kim |

(Continued)

*Primary Examiner* — Ellen Tran
(74) *Attorney, Agent, or Firm* — Womble Bond Dickinson (US) LLP

(57) ABSTRACT

A method for encrypting database files includes generating a mapping for a plurality of encrypted files. A first encrypted file of the plurality of encrypted files is encrypted with a first encryption key. The method includes generating a second encrypted file by re-encrypting, for a period of time, data in the first encrypted file using a second encryption key. The first encrypted file remains accessible to one or more queries during the period of time. The method includes updating the mapping to associate the second encrypted file with the first encrypted file. The mapping is updated after the second encrypted file has been generated. The method includes preventing a query from accessing the first encrypted file after the second encrypted file has been generated.

20 Claims, 5 Drawing Sheets

(56) References Cited

U.S. PATENT DOCUMENTS

| | | |
|---|---|---|
| 2009/0316887 A1 | 12/2009 | Lee et al. |
| 2010/0153748 A1* | 6/2010 | Valfridsson ......... G06F 21/6227 713/193 |
| 2010/0161995 A1 | 6/2010 | Browning |
| 2012/0204032 A1 | 8/2012 | Wilkins et al. |
| 2014/0143556 A1 | 5/2014 | Mattsson |
| 2014/0237234 A1 | 8/2014 | O'Connor et al. |
| 2015/0178506 A1 | 6/2015 | Elovici et al. |
| 2015/0310221 A1 | 10/2015 | Lietz et al. |
| 2016/0132692 A1 | 5/2016 | Kerschbaum |
| 2016/0300073 A1 | 10/2016 | Pomeroy et al. |

\* cited by examiner

ENCRYPTING DATABASE FILES

CROSS-REFERENCE TO RELATED APPLICATIONS

This application is a continuation of U.S. application Ser. No. 17/228,379 entitled "Systems, Methods, and Devices for Encrypting Database Data," and filed on Apr. 12, 2021, which is a continuation of U.S. application Ser. No. 15/286,112, entitled "Systems, Methods, and Devices for Encrypting Database Data," and filed on Oct. 5, 2016, now issued as U.S. Pat. No. 10,977,383 on Apr. 13, 2021. The disclosure of the above-referenced application is incorporated herein by reference in its entirety.

TECHNICAL FIELD

The present disclosure relates to databases and more particularly relates to encrypting data in one or more databases.

BACKGROUND

Databases are widely used for data storage and access in computing applications. Databases may include one or more tables that include or reference data that can be read, modified, or deleted using queries. In some cases, databases may be used for storing and/or accessing personal information or other sensitive information. Secure storage and access of database data may be provided by encrypting and/or storing data in an encrypted form to prevent unauthorized access.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1:
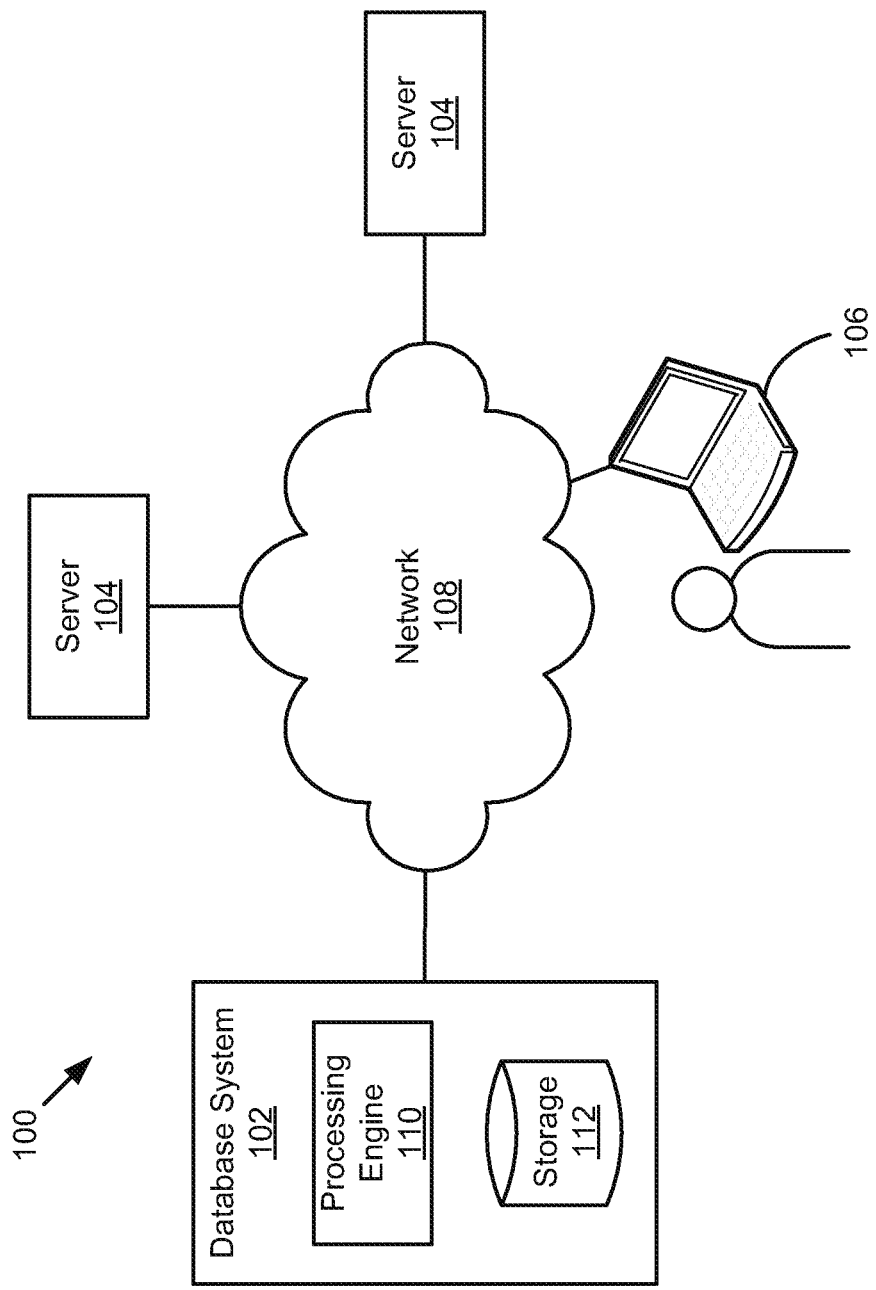
FIG. 1 is a schematic diagram illustrating an example system for storing and providing access to database data.

Security of data stored or referenced by database tables can be accomplished by encrypting data using an encryption key or other encryption mechanism. For example, data may be encrypted after receipt using a corresponding encryption key to place the data in an encrypted state. As another example, some stored data may already be stored in an encrypted state and needs to be rekeyed. For example, an updated key may be applied periodically to improve security. However, during an encryption process, including a re-keying process, the files or data being encrypted may be locked or inaccessible. In situations where a large amount of data is being encrypted, users may experience down time in that they are blocked from accessing the data and may experience delays or errors in running queries.

Applicants have developed systems, methods, and devices that encrypt or re-key data without locking database data. For example, a system may encrypt previously unencrypted customer data or re-encrypt ("rekey") customer data without interfering, interrupting, or impacting customer workloads, thus leading to no downtime during encryption. According to one embodiment, encryption or re-encryption is done in the background or on-the-fly without any access outage. For example, no downtime, locking, or interruption of customer queries result during the encryption/re-encryption process. Thus, encryption and re-encryption of data in a database table may be performed in parallel to executing customer queries. In one embodiment, periodic re-encryption of customer data may be performed to meet security requirements or preferences of customers.

According to one example embodiment, a database system includes a metadata store storing one or more tables, an encryption key store for storing one or more encryption keys for data in or corresponding to the one or more tables, and a file store configured to store data files referenced in the one or more tables. The database system may also include a processing engine that includes a key generation component, an encryption component, and an atomicity component. The key generation component is configured to generate an encryption key for a first file stored in the file store, wherein a table in the metadata store comprises an entry pointing to the first file. The encryption component is configured to generate a second file by encrypting the first file in the data store using the encryption key. The atomicity component is configured to modify the entry in the table to point to the second file, wherein the modification of the entry is performed atomically. As used herein, the term "atomically" refers to transactions that are indivisible and irreducible and are a series of database operations that are either completed in total or not completed at all. For example, a transaction that changes more than one value in a table is atomic if either all the changes are performed or none of the changes are performed. Any queries or accesses of the data may see or receive results that either includes all the changes of the transaction or none of the changes.

In one embodiment, the key generation component is configured to generate the encryption key, the encryption component is configured to generate the second file, and the atomicity component is configured to modify the entry in the table as a background process during processing of queries against the database. In one embodiment, prior to modifying the entry in the table being completed, read access of the first file is allowed in response to one or more queries.

As an example, the processing engine may execute a first customer query, background job, and a second customer query. The background job creates a new encryption key that is saved in the encryption key store. Background job reads a first set of files (possibly decrypting these files if they are encrypted) and uses the new encryption key to encrypt these files. Thereby, the background job produces a set of new files, which contain the same contents as the first set of files and are also encrypted with the new encryption key instead of being unencrypted or encrypted with an old key. The background job then modifies a mapping table in the metadata store to point a database table to the new set of data files. This modification of which files are pointed to happens atomically. If a customer query, such as the first customer query, is executed before the background job finishes (e.g., finishes modification of where the table points), the customer query will read data from the first set of data files. If the customer query is executed after the background job finished, such as the second customer query, the customer query will read data from the new set of data files. According to one embodiment, at no time is the first or second customer query halted, stopped, interrupted, or denied access.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Turning to the figures, FIG. 1 is a schematic diagram of a system 100 for providing and accessing database data. The system 100 includes a database system 102, one or more servers 104, and a client computing system 106. The database system 102, the one or more servers 104, and/or the client computing system 106 may communicate with each other using a network 108, such as the Internet. For example, the one or more servers 104, and/or the client computing system 106 may access the database system 102 over the network 108 to query a database and/or receive data from a database. The data from the database may be used by the one or more servers 104 or client computing systems 106 for any type of computing application.

The database system 102 includes a processing engine 110 and storage 112. The storage 112 may include storage media for storing data. For example, the storage 112 may include one or more storage devices for storing database tables, encryption keys, data files, or any other data. The processing engine 110 may include hardware and/or software for processing data in the storage 112 or queries/instructions received from remote devices, such as the servers 104 or client computing system 106. In one embodiment, the processing engine 110 is configured to encrypt and/or decrypt data stored in the storage 112 without blocking access to data by external systems or interrupting responses to queries.

Figure 2:
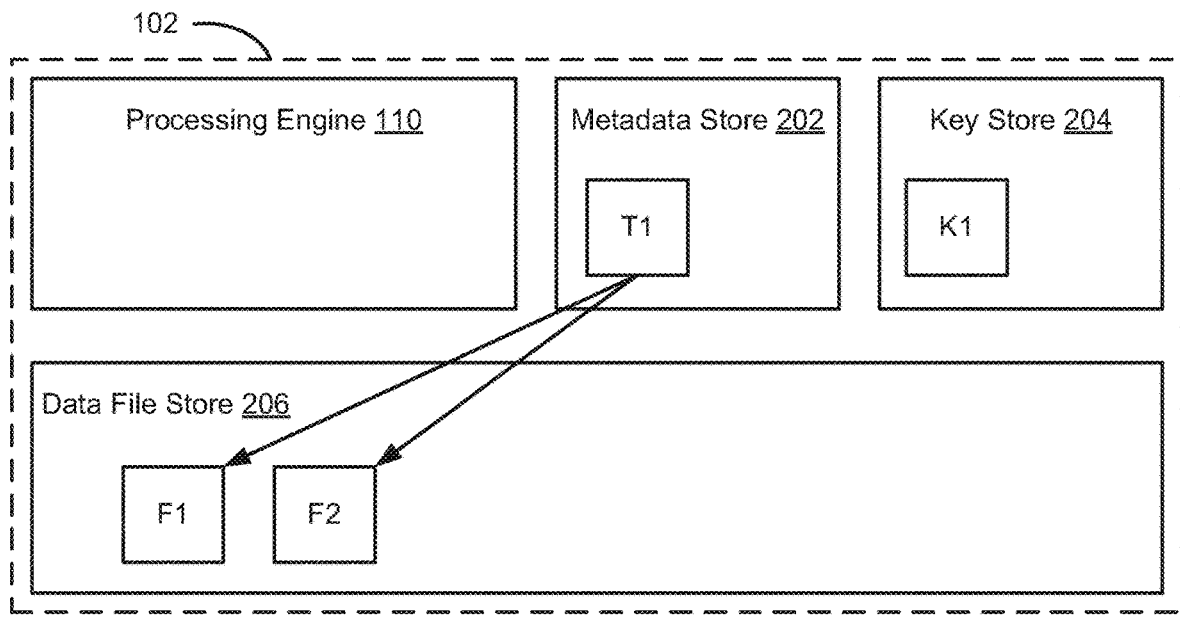
FIGS. 2-4 are logical block diagrams illustrating a process for encrypting data in parallel with processing database queries, according to one embodiment.
Figure 3:
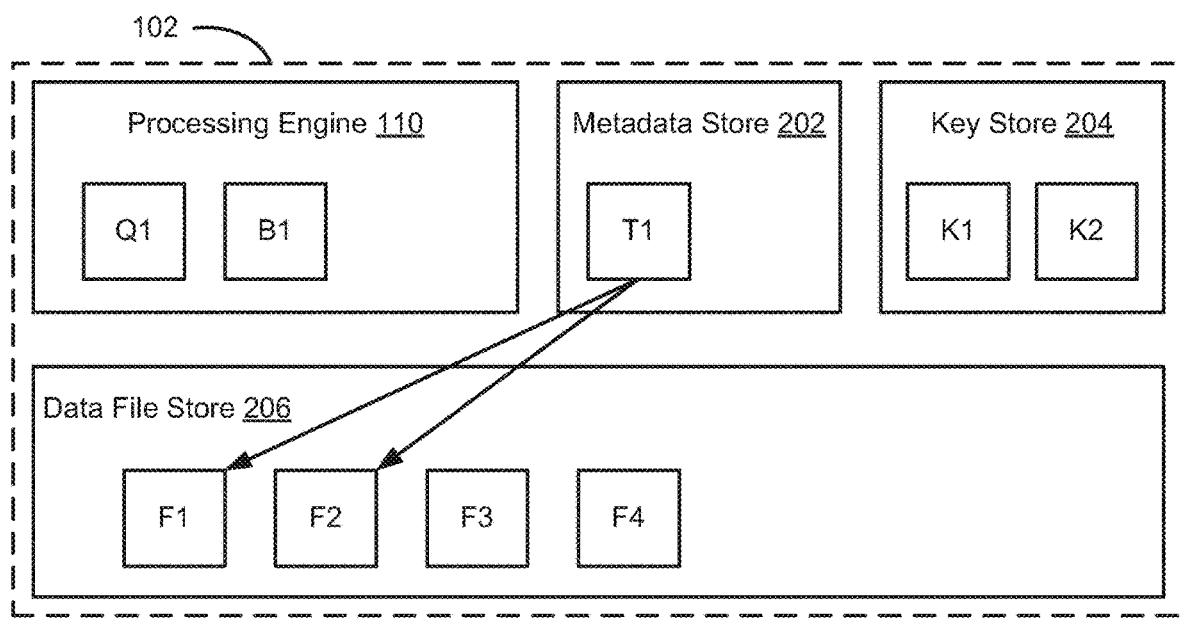
Figure 4:
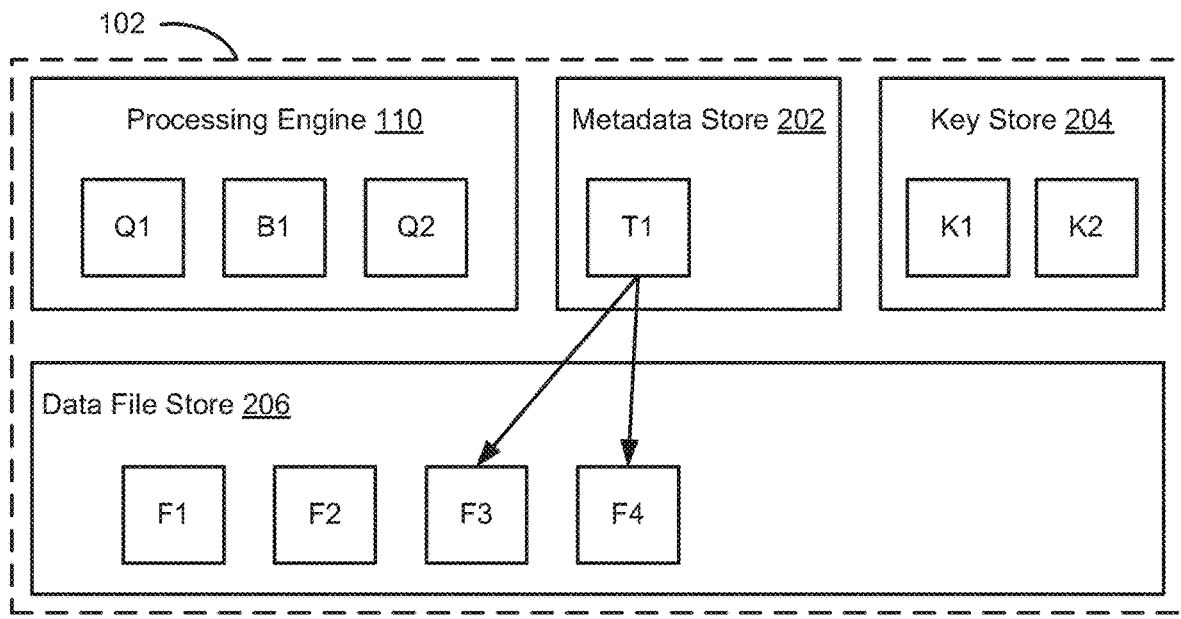

FIGS. 2-4 illustrate a process for encrypting data without interrupting customer workloads, according to one embodiment. FIG. 2 is a logical block diagram of a database system 102 that includes a processing engine 110, a metadata store 202, a key store 204, and a data file store 206. The processing engine 110 may include one or more processors, computer readable code storing instructions, and/or other hardware for processing queries, requests, instructions, or the like for accessing and storing data in the metadata store 202, the key store 204, and the data file store 206. The processing engine 110 may execute customer queries and system-owned background jobs. The metadata store 202 maintains metadata of database tables and data files, such as an example table T1. In particular, the metadata store 202 may maintain a mapping table from database tables to files that contain data stored in the respective database tables. For example, table T1 maps to files F1 and F2 stored in the data file store 206. The encryption key store 204 stores encryption keys of database tables. An encryption key K1 may be stored in the key store 204. For example, key K1 may be used for encryption of files F1 and F2. In one embodiment, the file encryption keys to encrypt files F1 and F2 are derived from key K1. The data file store 206 stores the data files. The metadata store 202, the key store 204, and/or the data file store 206 may be included or stored within the storage 112 of FIG. 1.

In one embodiment, during execution of a customer query the processing engine 110, the metadata store 202, the key store 204, and the data file store 206 work together to process the query and/or provide a response. For example, a customer query that selects all information in database table T1 may be received by the database system 102. When the processing engine 110 executes the customer query, it may reference information stored in the metadata store 202. The metadata store 202 maintains the mapping of a database table T1 to data files F1 and F2 in the data files store 206. The processing engine 110 uses that information to read files F1 and F2. If the files F1 and F2 are encrypted, the processing engine 110 may retrieve the encryption key K1 from the encryption key store 204. The processing engine 110 may then execute customer query that accesses table T1 by reading (and potentially decrypting) files F1 and F2. Note that data files F1 and F2 may be encrypted or unencrypted.

In one embodiment, the database system 102 encrypts unencrypted data and/or re-encrypts encrypted data in database tables without interrupting customer workloads. At any time, even during encryption/re-encryption, the customer may be able to access all of their data in all of their databases without any downtime, interruption, or performance degradation. For example, a customer query may be processed and responded to even while encryption or decryption of a relevant file is being performed.

FIG. 3 is a logical block diagram of the database system 102 after an encryption/re-keying process (illustrated as background process B1) has begun. The background process may be executed by the processing engine 110 in parallel to the execution of customer queries, such as query Q1. The background process B1 generates a new encryption key K2, which is saved in the key store 204. The background process B1 encrypts data files with the new encryption key K2, producing new data files. For example, the background process B1 may create new data files F3 and F4 that are encrypted files that include the same contents as the old data files F1 and F2, respectively. For example, the only difference between F1 and F3 or F2 and F4 may be that the new data files F3 and F4 are encrypted with the new encryption key K2, rather than being unencrypted or encrypted with an old encryption key K1. During this process, F1 and F2 may still be accessible to any query, such as Q1. For example, F1 and F2 remain in the data file store 206 and are unchanged. Furthermore, the mapping of the table T1 has not yet changed so any queries performed are performed against F1 and F2, even though the new encryption key K2 and the new files F3 and F4 may have already been created.

After creation of the new data files F3 and F4, the background process B1 then modifies the mapping table T1 in the metadata store 202 to point T1 to the new data files F3 and F4, as shown in FIG. 4. This modification happens "atomically," as a single operation, in a transaction. Any customer queries, which are executed before the modification, will access the old data files, F1 and F2. Any customer queries, which are executed after the modification (e.g., pointing to the new files), will access the new data files F3 and F4. FIG. 4 also shows a query Q2 that is executed after B1 finishes (after the modification to T1 has occurred) and thus will operate on files F3 and F4. In one embodiment, at no time are customer queries blocked or interrupted.

Even after modifying the table T1 to point to F3 and F4, there may be queries that began before the modification. Thus, F1 and F2 may be retained in the data file store 206 and accessed by queries, such as read queries, which began before the modification. In one embodiment, after all queries that accessed the old data files F1 and F2 have completed, data files F1 and F2 may be deleted from the data file store 206.

The process depicted in FIGS. 2-4 and elsewhere herein may accommodate queries with write accesses in addition to read queries. For example, processing read queries does not result in a change to a data file so they may be performed against either an old file (unencrypted or encrypted by a first key) or a new file that includes the same data, but simply requires usage of a new key, K2. With regard to queries with write accesses, such as queries that insert or update data in database tables, the actual data changes, not just an encryption state. In that case of queries with write accesses, the new encryption key may be created before starting the background job. If a query is received that writes to a database table, the query will write to the table using the new encryption key.

According to one embodiment, if a query with a write access causes an update or change to F1, which is referenced by T1, the processing engine 110 may create a new file, which will be referenced as F5. F5 may include the data from F1 with the change to the underlying data as indicated by the query as well as be in an encrypted state based on the new key K2. In other words, the query with write access to F1 may be used by the background process B1 of the processing engine 110 as an opportunity to start using the new encryption key K2 and update the metadata store 202 to point to the new file F5. All future queries, which would have accessed F1, will then use F5 instead and B1 can continue the process of creating other new encrypted files and modifying the table T1 to point to those other new encrypted files. In one embodiment, the background process B1 will not wait until write queries have finished. For example, background process B1 may never conflict with write queries because background process B1 reads files F1 and F2 and creates files F3 and F4 whereas the write query reads files F1 and creates file F5. Thus, in at least one embodiment, there are no write conflicts, and thus no blocking or interrupts are necessary.

In one embodiment, the background process B1 causes the processing engine 110 to be fault tolerant to failures. For example, if the background process B1 fails and F3 and/or F4 are not successfully created, the system can continue to use F1 and F2. The background process B1 may continue to attempt to rekey F1 and F2 as new files, and F1 and F2 will continue to be used, until new files F3 and F4 are successfully written to disk. In one embodiment, only after F3 and F4 are successfully written to disk does the background process B1 modify the table T1 to point to the new files F3 and F4.

Figure 5:
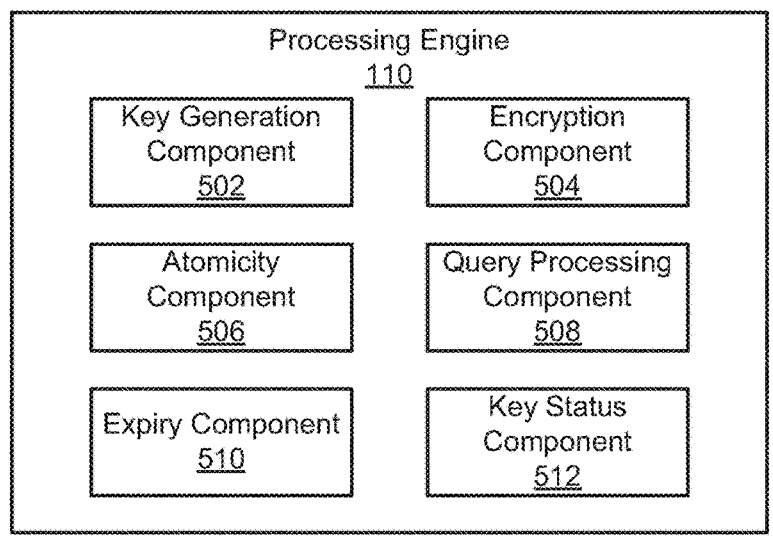
FIG. 5 is a schematic block diagram illustrating components of a processing engine, according to one embodiment.

FIG. 5 is a schematic block diagram of a processing engine 110. The processing engine 110 includes a key generation component 502, an encryption component 504, an atomicity component 506, a query processing component 508, an expiry component 510, and a key status component 512. The components 502-512 are given by way of example only and may not all be included in all embodiments. For example, each of the components 502-512 may be included in or may be implemented as part of a separate device or system.

The key generation component 502 generates encryption keys. In one embodiment, the key generation component 502 is configured to generate an encryption key for encryption of one or more tables in a metadata store 202 and/or files in a data file store 206. For example, a file may already exist in the data file store 206 and may be in an un-encrypted state or may be encrypted with an old encryption key. The key generation component 502 may generate a new key for the file and store the key in the key store 204. The new key may be generated using any type of key generation algorithm including random number generators, pseudo random number generators, system entropy seed data, and/or other methods known in the art. The key generation component 502 may generate any type of key such as a key used for symmetric-key encryption/decryption algorithms. The key generation component 502 may generate a new encryption key without deleting, for at least some duration, any old encryption keys. For example, an old encryption key may reside within the key store 204 until there is no longer any data in the metadata store 202 or data file store that uses the old encryption key, or until all queries that need the old key have finished. In one embodiment, keeping both the old and new keys in store for a period of time allows user queries to continue to be processed with not down-time or delay.

The encryption component 504 encrypts or decrypts data based on a key. For example, the encryption component 504 may perform any encryption algorithm on a data file, entry in a table, or the like using a symmetric key encryption algorithm and an encryption key stored in the key store 204. In one embodiment, the encryption component 504 is configured to generate, based on a first version of a file, a second version of the file by encrypting the first version of the file using a new encryption key generated by the key generation component 502. The encryption component 504 may retrieve the new encryption key from the key store 204 for use during encryption. For example, the encryption component 504 may generate a new file, with the old file still in memory. The new file may include all the data from the old file, but may simply be an encrypted or re-keyed version based on a new encryption key. In one embodiment, there may be a time period during which a first version and second version of a file remain in memory. Keeping both versions in memory may allow queries to be performed against the old version until all encryption using the new key is performed and a table is updated to point to the new file version(s).

In one embodiment, the encryption component 504 is configured to determine whether a new encryption key for one or more files has been generated. For example, the encryption component 504 may be notified by the key generation component 502 that a new key has been generated and is stored in the key store 204. The encryption component 504 may also determine whether a query with write access has been received or started. If the query with write access has been received and a new key has been generated, the encryption component 504 may encrypt a file that has been modified based on the query with write access and store that file in the file data store 206. For example, the new encrypted file may not only be encrypted using a different key than the old file, but the new file may also include any modification, deletion, and/or update to the data as indicated by the query with write access.

The atomicity component 506 is configured to perform at least some transactions in an atomic manner or to maintain atomicity. The terms atomicity or atomic transaction, as used herein, are given to refer to transactions that are either completed in total or not completed at all. For example, a transaction that changes more than one value in a table is atomic if either all the changes are performed or none of the changes are performed. Any queries or accesses of the data may see or receive results that either includes all the changes of the transaction or none of the changes. For example, with reference to FIGS. 3-4, the modification of the table T1 to point to the new files is an atomic transaction only if the changes are all performed or not performed at all. This ensures consistency that all read queries performed before completion of a transaction receive uniform data and all read queries performed after the completion of the transaction receive uniform data (unless another atomic transaction is performed).

In one embodiment, the atomicity component 506 is configured to allow queries to continue to access old data until the new data is completely ready. Once the new data is completely ready, the atomicity component 506 may update entries in a table or other data to start using the new data. These updates to entries in the table may be performed faster than the actual changes to the data. For example, it may take some time to encrypt all data files for a customer using the new key. However, because the old data can still be used during encryption, the customer does not experience a delay or lockout during that time period. After the encryption process has finished, the atomicity component 506 may update a table that points to the old data so that it instead points to the new files for which encryption has already finished. This update may be a simple matter of changing some entries in the table to point to the new files and/or new keys and thus may be performed very quickly. As mentioned previously, the atomicity component 506 ensures that all necessary changes are made or else none are made so that a uniform set of data may be used.

Because customer data may include a large amount of files, keys, and tables, the operations of the key generation component 502, encryption component 504, and/or atomicity component 506 may be performed on a single data file, key, or table or on a plurality or large number of data files, encryption keys, or tables. In some cases, it may be necessary that the changes for one or more keys, data files, or tables be performed atomically. For example, the encryption changes may proceed in two stages. The first stage may include a preparation stage in which one or more new keys are generated, and one or more files are created using the one or more new keys. When the first stage is finished and all the data is ready, the second stage may include the atomicity component 506 causing usage of data to be switched from the old data and any old keys to the new data and any new keys. Because the data is already available, the switch can be performed quickly and in an atomic manner such that queries performed before completion use the old data only and queries performed after completion use the new data only and experience little or no delay.

The query processing component 508 is configured to process database queries. The query processing component 508 may allow processing of data queries during or in parallel to the encryption or rekeying operations performed by the key generation component 502, encryption component 504, and/or the atomicity component 506. In one embodiment, the query processing component 508 performs queries against an old set of data (e.g., un-encrypted files or files using an old encryption key) while new keys or data is being generated. For example, the query processing component 508 may provide, prior to modifying an entry in a table, read access to on old file even though a new file has been generated.

Example operation of the query processing component 508 with respect to the files shown in FIGS. 3-4 may be illustrative. For example, the query processing component 508 during the state depicted in FIG. 3 may provide read access to F1 and F2 even though the new key K2 has been generated and/or encryption/generation of new files F3 and F4 has begun. In one embodiment, the query processing component 508 is configured to, prior to completion of the modification of an entry in T1 to point to new files F3 and F4, provided access to the F1 and F2 in response to any read requests. Additionally, in response to completion of the modification of the entry in T1 to point to new files F3 and F4, the query processing component 508 provides access to the new files F3 and F4. Each query received either only sees F1 and F2 or F3 and F4. Thus, the query processing component 508 may continue processing queries as a key generation component 502 generates an encryption key and the encryption component 504 generates new file based on the new key as part of a background process. When the atomicity component 506 makes changes to cause the new key and file(s) to be used, the query processing component 508 simply starts using the new key and files and thus users or customers may experience no downtime in accessing their data.

In one embodiment, the query processing component 508 may operate in a different manner when a write query, of query with write access, is received. For example, when a write query that makes changes to a first file or table is received, the query processing component 508 may check to see if a new key corresponding to that file or table has been generated. If a new key has been generated the query processing component 508 may make a second file that includes data from the first file with the modifications indicated in the write query. The query processing component 508 may also cause the encryption component 504 to encrypt the second file using the new key. The table may then be updated to use the second file and use of the first file may be ended. Thus, if write queries are received, corresponding files may start using the new encryption key even if a background process has not yet finished. In one embodiment, write queries always generate new files and always use the most recent key to encrypt files.

Using the new key for write accesses may be advantageous because a decryption/encryption process may need to be performed anyway to make the change indicated by the write accesses. For example, when a write access is received that changes a specific encrypted file, that specific file must be decrypted using a corresponding key, modified based on the write access, and re-encrypted using the corresponding key. If a new key has been generated, this process still includes a decryption process and an encryption process, but the decryption is performed with an old key and the encryption is performed with a new key. Thus, there is no additional delay to using the new key instead of an old key.

In one embodiment, the combination of generating encryption keys and new encrypted files in the background with the on-the-fly encryption of files based on write accesses can lead to encryption or rekeying of data with no downtime and/or no additional delay experienced by customers in accessing data.

The expiry component 510 is configured to mark old files as expired and/or delete old files. For example, in response to atomicity component 506 modifying a table to point to new files, the expiry component 510 may mark the old files as expired. Files marked as expired may not be subject of any new queries. For example, when a file is marked as expired, the query processing component 508 may not allow any new queries to be started against the expired files and may only allow queries that were executing before the expiry state to finish. For examples, queries that began before the atomicity component 506 updates a table to point to new files may be allowed to finish based on the old files. Any newly started queries must use the new files. No new query touches a file in expiry phase.

In one embodiment, the expiry component 510 may delete old files after all queries using the old files have completed. For example, with reference to FIGS. 3 and 4, after atomic switching of metadata by the atomicity component 506 to point to F3 and F4, the expiry component 510 may wait until all queries using F1 and F2 are finished before deletion of F1 and F2. The expiry component 510 may run as a background cleaner on a periodic basis (such as every 10 minutes or another time period) to see if all queries are run for specific files and when the queries started. If all queries against an expired file have finished, the expiry component 510 may delete the expired file.

The key status component 512 is configured to determine a status of an encryption key. For example, security protocols may require more than just storing encrypted data. It may be required that the keys used to encrypt data are updated on a periodic basis, such as every year, every month, every week, every day or at some other periodic basis. This can increase security for customer data. In one embodiment, the key status component 512 is configured to determine an age of an encryption key. If the encryption key is older than a threshold (such as a few months, a year, or other configurable threshold), the key status component 512 may trigger generation of a new key and/or the rekeying of corresponding data (e.g., by the key generation component 502, encryption component 504, and atomicity component 506). If an encryption key is not older than the threshold, nothing changes and the key can continue to be used. The key status component 512 may run key status checks on a periodic basis to ensure that keys are not outdated. For example, ongoing checks for outdated keys could be done hourly, daily, weekly, monthly, etc.

Thus, the key status component 512, and other components of the processing engine 110 may automatically ensure that keys meet any age requirements. With the foregoing processes, ongoing encryption, rekeying, and key management may be performed in the background without locking customer data or causing a customer to experience any downtime for encryption. Thus, high availability of data and high security can be achieved in an efficient and robust manner.

Figure 6:
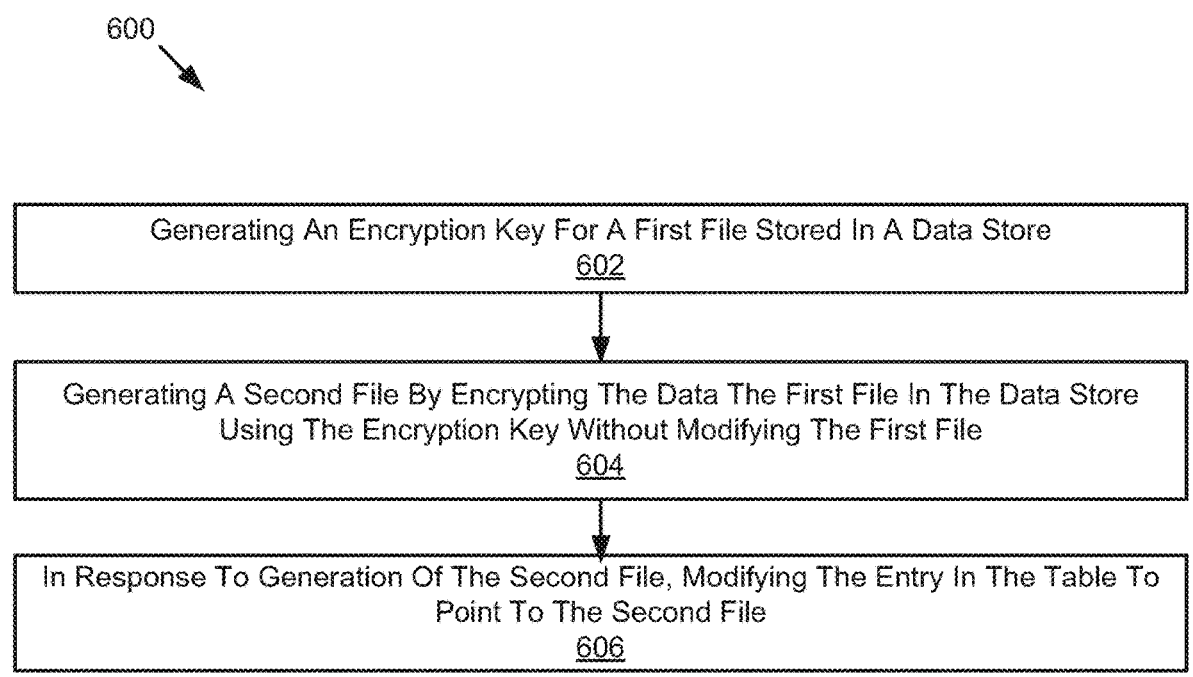
FIG. 6 is a schematic flow chart diagram illustrating a method for encrypting database data, according to one embodiment.

FIG. 6 is a schematic flow chart diagram illustrating an example method 600 for encrypting database data. The method 600 may be performed by a processing engine or database system, such as a processing engine 110 in any of FIGS. 1-5 or the database system 102 in any of FIGS. 1-4.

The method 600 begins and a key generation component 502 generates at 602 an encryption key for a first file stored in a data store. A table in a database includes an entry pointing to the first file. An encryption component 504 generates at 604 a second file by encrypting the data the first file in the data store using the encryption key without modifying the first file. An atomicity component 506, in response to generation of the second file, modifies at 606 the entry in the table to point to the second file. The modification of the entry is performed atomically. In one embodiment, generating at 602 the encryption key, generating at 604 the second file, and modifying at 606 the entry in the table are performed without locking the database. For example, the method may include generating at 602 the encryption key, generating at 604 the second file, and modifying at 606 the entry in the table as part of a background process during processing of queries against the database by a query processing component 508. In one embodiment, the method further includes a query processing component 508 permitting read access to the first file, prior to modifying at 606 the entry in the table being completed. The query processing component 508 may permit read access after one or more of generating of the encryption key or beginning generating the second file while still before completion of the modification at 606 of the entry. In one embodiment, the query processing component 508, prior to completion of the modification at 606 of the entry, allows any read requests to access the first file, and in-response to completion of the modification at 606 of the entry, allows read requests to access the second file.

Figure 7:
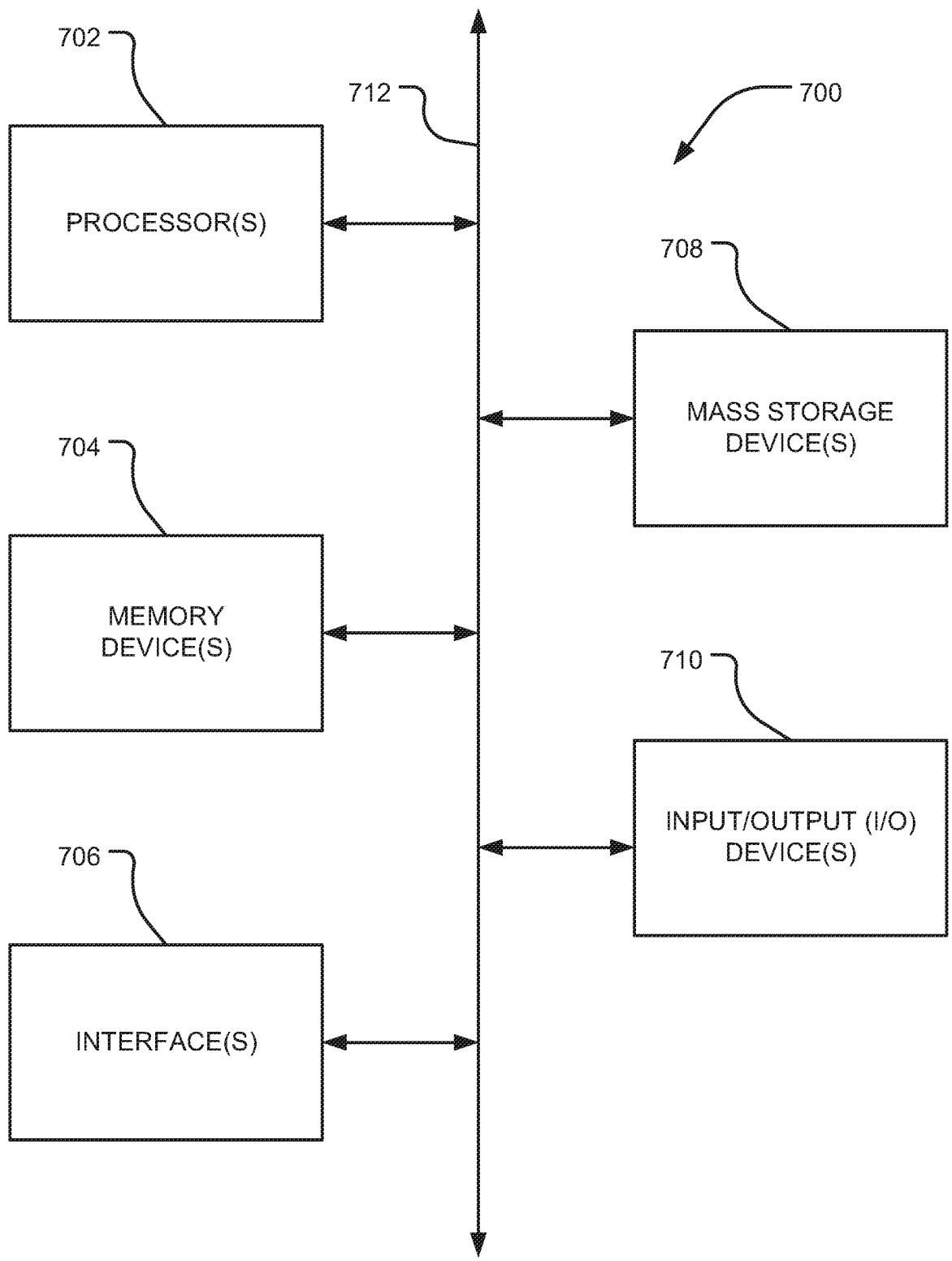
FIG. 7 is a block diagram depicting an example computing device or system consistent with one or more embodiments disclosed herein.

FIG. 7 is a block diagram depicting an example computing device 700. In some embodiments, computing device 700 is used to implement one or more of the systems and components discussed herein. Further, computing device 700 may interact with any of the systems and components described herein. Accordingly, computing device 700 may be used to perform various procedures and tasks, such as those discussed herein. Computing device 700 can function as a server, a client or any other computing entity. Computing device 700 can be any of a wide variety of computing devices, such as a desktop computer, a notebook computer, a server computer, a handheld computer, a tablet, and the like.

Computing device 700 includes one or more processor(s) 702, one or more memory device(s) 704, one or more interface(s) 706, one or more mass storage device(s) 708, and one or more Input/Output (I/O) device(s) 710, all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM)) and/or nonvolatile memory (e.g., read-only memory (ROM)). Memory device(s) 704 may also include rewritable ROM, such as Flash memory.

Mass storage device(s) 708 include various computer readable media, such as magnetic tapes, magnetic disks, optical disks, solid state memory (e.g., Flash memory), and so forth. Various drives may also be included in mass storage device(s) 708 to enable reading from and/or writing to the various computer readable media. Mass storage device(s) 708 include removable media and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Interface(s) 706 include various interfaces that allow computing device 700 to interact with other systems, devices, or computing environments. Example interface(s) 706 include any number of different network interfaces, such as interfaces to local area networks (LANs), wide area networks (WANs), wireless networks, and the Internet.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein.

EXAMPLES

The following examples pertain to further embodiments.

Example 1 is a method for encrypting database data. The method includes generating an encryption key for a first file stored in a data store, wherein a table in a database comprises an entry pointing to the first file. The method includes generating a second file by encrypting the data the first file in the data store using the encryption key without modifying the first file. The method includes, in response to generating the second file, modifying the entry in the table to point to the second file. The modification of the entry is performed atomically.

In Example 2, generating the encryption key, generating the second file, and modifying the entry in the table as in Example 1 are performed as a background process during processing of queries against the database.

In Example 3, the method as in any of Examples 1-2 further include, prior to modifying the entry in the table being completed, permitting read access to the first file.

In Example 4, permitting read access as in Example 3 includes permitting read access after one or more of generating of the encryption key or beginning generating the second file.

In Example 5, the method as in any of Examples 1-4 further includes storing the encryption key in a key store.

In Example 6, generating the encryption key, generating the second file, and modifying the entry in the table as in any of Examples 1-5 are performed without locking the database.

In Example 7, the method as in any of Examples 1-6 further includes, prior to completion of the modification of the entry, providing any read requests access to the first file, and in-response to completion of the modification of the entry, providing any read requests access to the second file.

In Example 8, the method as in any of Examples 1-7 further includes: receiving a query with write access for the table corresponding to the first file; determining whether a new encryption key has been generated for the first file; and in response to determining that the new encryption key has been generated, generating the second file by modifying the first file based on the query with write access and encrypting the second file using the new encryption key.

In Example 9, generating the encryption key, generating the second file, and modifying the entry in the table as in any of Examples 1-8 are performed as part of a method that includes: generating the encryption key for a plurality of first files comprising the first file; generating a plurality of second files comprising the second file using by encrypting the first files using the encryption key; and modifying a plurality of entries in the table to point to the plurality of second files, wherein the modification of the plurality of entries is performed atomically.

In Example 10, the method as in any of Examples 1-9 further includes removing the first file in response to modifying the entry in the table to point to the second file.

Example 11 is a system that includes a metadata store, an encryption key store, a file store, and a processing engine. The metadata store stores one or more tables. The encryption key store stores one or more encryption keys for data in or corresponding to the one or more tables. The file store stores data files referenced in the one or more tables. The processing engine includes a key generation component, an encryption component, and an atomicity component. The key generation component is configured to generate an encryption key for a first file stored in the file store, wherein a table in the metadata store comprises an entry pointing to the first file. The encryption component is configured to generate a second file by encrypting the first file in the data store using the encryption key. The atomicity component is configured to modify the entry in the table to point to the second file, wherein the modification of the entry is performed atomically.

In Example 12, the key generation component is configured to generate the encryption key, the encryption component is configured to generate the second file, and the atomicity component is configured to modify the entry in the table as in Example 11 as a background process during processing of queries against the database.

In Example 13, the processing engine as in any of Examples 11-12 further includes a query processing component configured to, prior to modifying the entry in the table being completed, providing read access to the first file in response to one or more queries.

In Example 14, the query processing component as in Example 13 is configured to provide read access to the first file during a time period after the key generation component has generated the encryption key or after the encryption component has begun generating the second file.

In Example 15, the key generation component as in any of Examples 11-14 is further configured to store the encryption key in a key store.

In Example 16, the key generation component is configured to generate the encryption key, the encryption component is configured to generate the second file, and the atomicity component is configured to modify the entry in the table as in any of Examples 11-15 without the system locking access to the database.

In Example 17, the system as in any of Examples 11-16 further includes a query processing component configured to: prior to completion of the modification of the entry, provided access to the first file in response to any read requests; and in-response to completion of the modification of the entry, provide access to the second file in response to any read requests.

In Example 18, the system as in any of Examples 11-7 further includes a query processing component configured to receive a query with write access for the table corresponding to the first file and to determine whether a new encryption key has been generated for the first file; and the encryption component is configured to, in response to determining that the new encryption key has been generated, generate the second file by modifying the first file based on the query with write access and by encrypting the second file using the new encryption key.

In Example 19, the system as in any of Examples 11-18 further includes an expiry component configured to, in response to atomicity component modifying the entry in the table to point to the second file, one or more of mark the first file as expired and delete the first file.

In Example 20, the key generation component as in any of Examples 11-19 is configured to generate the encryption key for a plurality of first files comprising the first file. The encryption component is configured to generate a plurality of second files comprising the second file using by encrypting the first files using the encryption key. The atomicity component is configured to modify a plurality of entries in the table to point to the plurality of second files, wherein the modification of the plurality of entries is performed atomically.

Example 21 is an apparatus including means to perform a method or realize an apparatus or system as in any of Examples 1-20.

Example 22 is a machine readable storage including machine-readable instructions, when executed, to implement a method or realize an apparatus of any of Examples 1-21.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method, comprising:
generating a mapping for a first group of encrypted files and a second group of encrypted files, wherein the mapping associates a first encrypted file of the first group of encrypted files with a different encrypted file of the second group of encrypted files, wherein the first encrypted file of the first group of encrypted files is generated based on a dataset and a first encryption key;
generating a second encrypted file by re-encrypting the data based on a second encryption key, wherein the first encrypted file and the second encrypted file co-exist for a predefined period of time;

generating, based on the mapping, an updated mapping to associate the second encrypted file with the different encrypted file of the second group of encrypted files;

directing, using the mapping, a first query to the first encrypted file when the first query arrives before generating the updated mapping; and directing, using the updated mapping, a second query to the second encrypted file when a second query arrives after generating the updated mapping.

2. The method of claim 1, removing the first encrypted file after the second encrypted file has been generated.

3. The method of claim 1, wherein generating the second encrypted file comprises:

generating the second encryption key; and decrypting the first encrypted file using the first encryption key to obtain the data in the first encrypted file.

4. The method of claim 1, further comprising:

marking the first encrypted file as expired after the second encrypted file has been generated.

5. The method of claim 1, wherein the mapping is stored in a metadata storage and the first group of encrypted files are stored in a separate storage.

6. The method of claim 5, further comprising:

storing one or more of the first encryption key or the second encryption key in the separate key storage.

7. The method of claim 1, further comprising:

permitting read access to the first encrypted file prior to the updating of the mapping being completed.

8. The method of claim 7, wherein permitting the read access to the first encrypted file comprises:

permitting the read access after one or more of: generation of the second encryption key or beginning generation of the second encrypted file.

9. The method of claim 1, further comprising:

receiving a third query with write access for one or more tables corresponding to the first encrypted file;

determining whether the second encryption key has been generated for the first encrypted file; and generating, in response to determining that the second encryption key has been generated, the second encrypted file by: modifying the first encrypted file based on the third query with write access and encrypting the second encrypted file based on the second encryption key.

10. The method of claim 1, further comprising:

generating additional encrypted files based on the second encryption key; and updating the mapping to include the additional encrypted files, wherein the mapping is updated after the additional encrypted files have been generated.

11. The method of claim 1, wherein one or more of:

generating the second encryption key is performed without locking the database;

generating the second encrypted is performed without locking the database; and updating the mapping is performed without locking the database.

12. An apparatus, comprising:

a memory to store data; and one or more processors coupled to the memory, the one or more processors to:

generate a mapping for a first group of encrypted files and a second group of encrypted files, wherein the mapping associates a first encrypted file of the first group of encrypted files with a different encrypted file of the second group of encrypted files, wherein the first encrypted file of the first group of encrypted files is generated based on a dataset and a first encryption key;

generate a second encrypted file by re-encrypting the data based on a second encryption key, wherein the first encrypted file and the second encrypted file co-exist for a predefined period of time;

generate, based on the mapping, an updated mapping to associate the second encrypted file with the different encrypted file of the second group of encrypted files;

direct, using the mapping, a first query to the first encrypted file when the first query arrives before generating the updated mapping; and direct, using the updated mapping, a second query to the second encrypted file when a second query arrives after generating the updated mapping.

13. The apparatus of claim 12, wherein the one or more processors are further to:

remove the first encrypted file after the second encrypted file has been generated.

14. The apparatus of claim 12, wherein to generate the second encrypted file the one or more processors are further to:

generate the second encryption key; and decrypt the first encrypted file using the first encryption key to obtain the data in the first encrypted file.

15. The apparatus of claim 12, wherein the one or more processors are further to:

mark the first encrypted file as expired after the second encrypted file has been generated.

16. The apparatus of claim 12, the one or more processors are further to:

permit read access to the first encrypted file prior to the updating of the mapping being completed.

17. The apparatus of claim 16, wherein to permit read access to the first encrypted file the one or more processors are further to:

permit read access after one or more of: generation of the second encryption key or beginning generation of the second encrypted file.

18. The apparatus of claim 12, wherein the one or more processors are further to:

receive a third query with write access for one or more tables corresponding to the first encrypted file;

determine whether the second encryption key has been generated for the first encrypted file; and generate, in response to determining that the second encryption key has been generated, the second encrypted file by: modifying the first encrypted file based on the third query with write access and encrypting the second encrypted file based on the second encryption key.

19. The apparatus of claim 12, wherein one or more of:

generating the second encryption key is performed without locking the database;

generating the second encrypted is performed without locking the database; and updating the mapping is performed without locking the database.

20. A non-transitory computer-readable medium storing instructions which, when executed by one or more processors of a computing device, cause the computing device to:

generate a mapping for a first group of encrypted files and a second group of encrypted files, wherein the mapping associates a first encrypted file of the first group of encrypted files with different encrypted file of the second group of encrypted files, wherein the first encrypted file of the first group of encrypted files is generated based on a dataset and a first encryption key;

generate, by the one or more processors, a second encrypted file by re-encrypting the data based on a second encryption key, wherein the first encrypted file and the second encrypted file co-exist for a predefined period of time;

generate, based on the mapping, an updated mapping to associate the second encrypted file with the different encrypted file of the second group of encrypted files;

direct, using the mapping, a first query to the first encrypted file when the first query arrives before generating the updated mapping; and direct, using the updated mapping, a second query to the second encrypted file when a second query arrives after generating the updated mapping.

* * * * *